No. 868,047. PATENTED OCT. 15, 1907.
G. S. WHITELEY.
VEHICLE WHEEL.
APPLICATION FILED APR. 18, 1906.
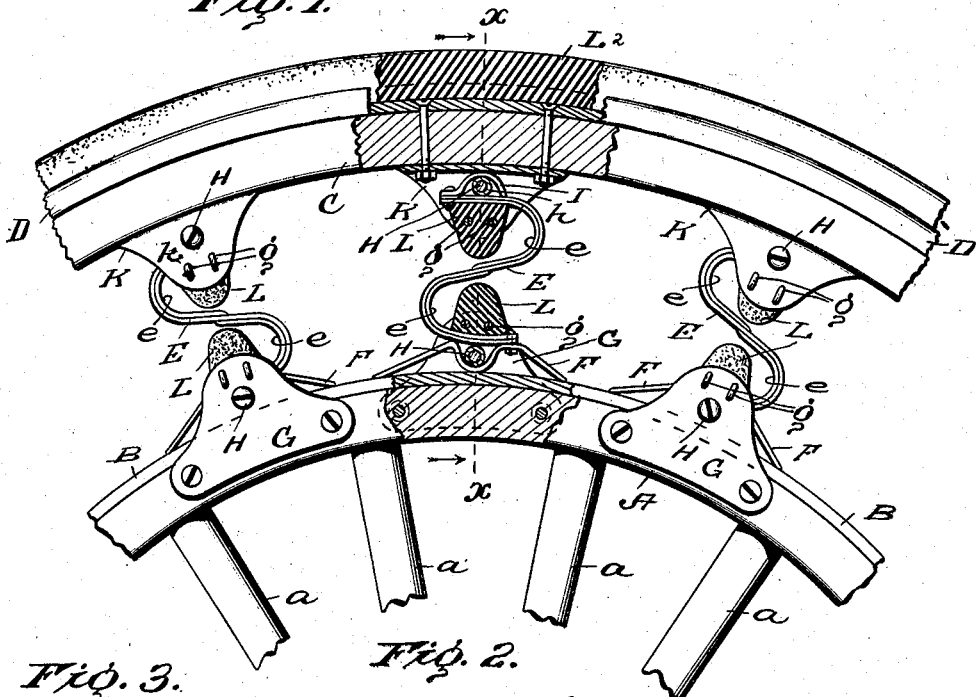
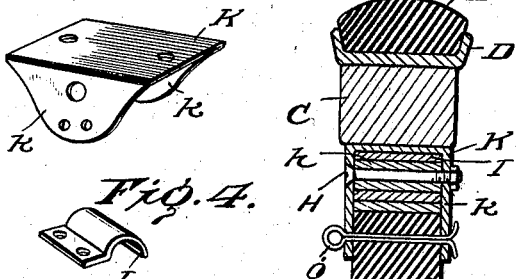
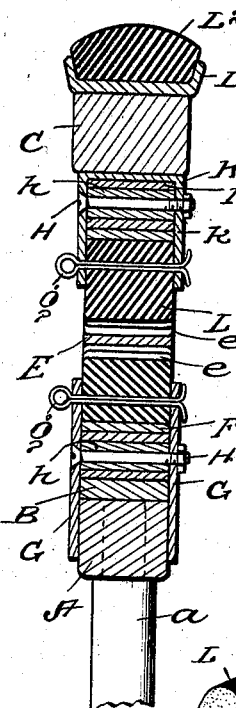
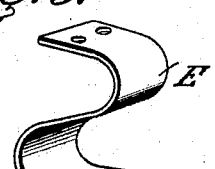
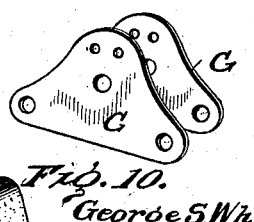
Witnesses
H. L. Amer.
H. H. Masson
Inventor
George S. Whiteley
by E. E. Masson,
Attorney

UNITED STATES PATENT OFFICE.

GEORGE S. WHITELEY, OF BALTIMORE, MARYLAND.

VEHICLE-WHEEL.

No. 868,047.
Specification of Letters Patent.
Patented Oct. 15, 1907.

Application filed April 18, 1906. Serial No. 312,375.

*To all whom it may concern:*

Be it known that I, GEORGE S. WHITELEY, a citizen of the United States, residing at Baltimore, in the county of Baltimore City and State of Maryland, have invented certain new and useful Improvements in Vehicle-Wheels, of which the following is a specification.

This invention relates to vehicle wheels, particularly of self-propelled road vehicles, which have their double rims elastically supported on S-shaped springs interposed between the outer rim and the inner rim; and the objects of my invention are to provide said springs with means to permit each end to rock to a certain extent in its attachments to the rims, and with means to limit the rocking movement; also to provide the springs with reinforcing spring leaves within their bent portions and also with rubber bumpers to prevent breakage of said parts when in use. I attain these objects by the construction illustrated in the accompanying drawing in which—

Figure 1, in a side view partly in section of a portion of a vehicle wheel constructed in accordance with my invention. Fig. 2, is a radial transverse section on line $x$—$x$ of Fig. 1, but on a larger scale. Fig. 3, is a perspective view of one of the bearing clip plates used to secure the outer end of one of the springs to the outer felly. Fig. 4, is a perspective view of a small plate to be secured upon the outer end of one of the springs, its hooked portion being to receive the pivot bolt uniting the spring to the bearing plate. Fig. 5, is a perspective view of one of the S-shaped springs. Fig. 6, is a perspective view of one of the spring reinforcing springs to be secured within each bend of the spring. Fig. 7, is a perspective view of a sleeve, preferably of bronze to receive the pivot bolt of each end of the spring. Fig. 8, is a perspective view of one of the spring plates used to connect the inner end of one of the S-shaped springs to the bearing plate used on the inner felly by means of a transverse bolt and sleeve which are to be received in its concave portion, the downwardly bent ends of the spring plate being to limit the oscillation of each S-shaped spring. Fig. 9, is a perspective view of a pair of the retaining clip-plates of the inner felly. Fig. 10, is a perspective view of one of the rubber bumpers.

In said drawings, A, represents the wooden felly of a wheel having spokes $a$, of any suitable form and size, and a rim B, of iron. A few inches from the rim B, there is another wood felly C, having a rim D of channel iron on its periphery. Between the rim B, of the inner wheel, and the felly C, of the outer wheel are placed a series of S-shaped springs E, of elastic flat metal. Said springs are so arranged that the bends of each one alternate in direction with the bends of the two springs on each side thereof. In other words one half of the springs used are in the form of a true S, while others are in the form of an inverted S, so that the bent portion of one will re-act against the bent portions of the next spring, whether the vehicle progresses forward or backward.

To the inner end of each spring E, is secured a spring plate F, of flat metal to secure it to one of the side plates G, of the felly. Each plate F, is concaved at $f$, about the middle of its length to receive a bolt H, and its sleeve $h$ preferably of bronze. Said bolt is used to connect the springs E and F, to the side plates G, as it passes through said side plates G. The ends $f^2$ of the spring-plate F are bent downwardly to rest upon the rim B of the wheel to prevent any excessive side motion of the springs E, although the bolt H and its sleeve $h$ are to permit a rocking motion of the springs E. Each side plate G is secured to the felly A, by bolts passing transversely therethrough.

To the outer end of each spring E, is secured a hook-plate I; to receive a bolt H and its bronze sleeve $h$, said bolt passing through the side lugs $k$, of a clip-plate K. Each side lug of the plate K, radially extends sufficiently to receive two cotter-pins $g$, which pass also through the rubber bumpers L, and said plate K, is secured to the felly C, and to the rim D, by bolts passing radially therethrough. The rim D, being of channel iron, is suitable to receive a rubber tire L² of any well known form. To reinforce the bent portions of the spring E, each one is provided near each end with a leaf spring $e$, having flat ends and a curved middle portion, one of the flat ends being secured to the spring E. Bumpers L of rubber are also used and secured by cotter pins to the side plates G and $k$ to rest opposite the inner bends of the springs E, to prevent any excessive flexion of said springs.

Having now fully described my invention, I claim:

1. In a vehicle wheel the combination of an inner wheel having spokes and an iron rim, an outer wheel having an iron rim and a rubber tire and between said wheels a series of S-shaped springs having on their inner end a spring plate F, secured thereto and a pivot bolt between said spring and spring plate, and side plates receiving the ends of the pivot bolt.

2. In a vehicle wheel the combination of an inner wheel having spokes, an outer wheel having an iron rim and a rubber tire and between said wheels a series of S-shaped springs having on their outer ends a hook-plate I, secured thereto, and a pivot bolt between said spring and the hook-plate and a clip-plate securing the ends of the pivot bolt.

3. In combination with the inner and outer wheels of a vehicle wheel above described and the S-shaped springs uniting them and the side plates G, the rubber bumpers L secured to said plates and resting between the bends of the S-shaped springs.

In testimony whereof I affix my signature in presence of two witnesses.

GEORGE S. WHITELEY.

Witnesses:
JOHN P. PACA,
MADISON MARINE.